June 16, 1953

J. F. FEYES 2,642,145

COMBINED IGNITION KEY AND EMERGENCY
BRAKE REMINDER MECHANISM

Filed April 19, 1952

INVENTOR.
Joseph F. Feyes

BY Edward C. Healy

ATTORNEY

June 16, 1953            J. F. FEYES            2,642,145
COMBINED IGNITION KEY AND EMERGENCY
BRAKE REMINDER MECHANISM Filed April 19, 1952            2 Sheets-Sheet 2

*INVENTOR.*
Joseph F. Feyes
BY Edward C. Healy
*ATTORNEY*

Patented June 16, 1953

2,642,145

UNITED STATES PATENT OFFICE 2,642,145

COMBINED IGNITION KEY AND EMERGENCY BRAKE REMINDER MECHANISM

Joseph F. Feyes, San Francisco, Calif.

Application April 19, 1952, Serial No. 283,231

1 Claim. (Cl. 180—82)

This invention relates to safety appliances for motor vehicles and has particular reference to a combined ignition key and hand brake reminder mechanism.

It is well known that many accidents have happened due to the fact that when an unattended motor vehicle is parked on a grade, the driver frequently forgets to set the hand brake. When this condition exists, the car moves, gains momentum as it progresses down a hill or grade, and there is a resultant smashing of the runaway car, damage to property and frequently serious injuries to pedestrains. To eliminate this hazard I have devised the present reminder mechanism, whereby the motor cannot be shut off until the hand brake has been set.

The primary object of the invention is to employ a simplified arrangement of a lever or link mechanism associated with the ignition key barrel that is electrically connected to the hand brake, and to utilize a magnet or coil capable of being energized or de-energized, whereby it is impossible to shut off the motor until the hand brake has been set or actuated to its well-known safety position.

An additional object of the invention is to assemble the operating lever means and associated parts with the instrument panel or dash board, where the actuating means will be inconspicuous and easily and conveniently operated.

A further object of the invention is to employ an efficient and fool-proof safety appliance of the character described that is simple in construction, economical to manufacture, strong, durable, highly servicable in use, positive in operation and which appliance will definitely serve as a psychological reminder and indicator that the emergency brake has not been set.

Other objects and advantages will be apparent during the course of the following description.

In the accompanying drawing forming a part of this specification, and in which like numerals are employed to designate like parts throughout the same:

Figure 1:
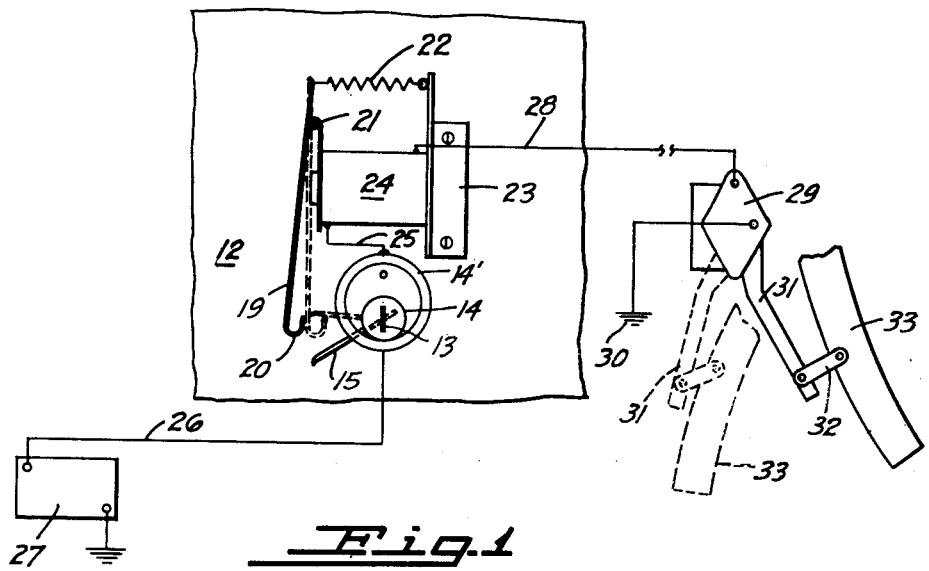
Fig. 1 is essentially a schematic view showing the electric circuit used to operate the appliance and also illustrating a fragment of the dash board with which the appliance is associated.
Figure 2:
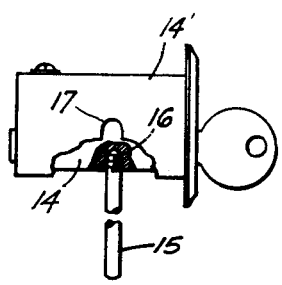
Fig. 2 is a side elevation view of the means for receiving the ignition key, a portion of the barrel being broken away to illustrate the arcuate slot therein in which the actuated lever travels.

In the accompanying drawing wherein for the purpose of illustration is shown the preferred and modified embodiments of my invention, and as disclosed to advantage in Fig. 1, the numeral 12 indicates the instrument panel or the dash of a motor vehicle in which the ignition switch 13 is mounted. An inner barrel or tumbler is indicated by the numeral 14, and the outer barrel by the numeral 14'. A lever 15 is tapped to the inner barrel, as at 16, which lever is adapted to be actuated in an arc of a circle through an arcuate slot 17, formed in the outer barrel casing. There is also employed a magnetic spring arm 19, having a curved, bent extremity 20. It will be noted that the arm 19 is pivotally secured to the dash, as at 21, and has connected thereto, at its end, a retractor spring 22, in turn connected to a portion of a bracket 23, that secures a magnet or coil 24, to the dash. It will be further observed that a lead wire 25, is interposed between the barrel and the magnet, and that a conductor 26, connected to the battery 27, or any suitable source of electrical energy, also leads to the ignition switch. A second lead 28, from the magnet, is in turn connected to the brake switch 29, that is grounded as at 30. A brake switch arm, 31, has a linkage connection 32, with a hand brake 33.

In the operation of this form of the invention as disclosed in Fig. 1, a turning of the ignition key will cause the switch to move to its dotted line position. If the hand brake, 33, is set to the full line position, the brake switch 29 is open and the magnet is not energized. As soon as the hand brake is released to its dotted line position, the switch arm 31 makes contact, thus energizing the magnet.

This action pulls the arm 19 from its full line position to the dotted line position directly under the ignition switch arm or lever 15, thus preventing the turning of the switch back to the "Off" position until the magnet is de-energized by setting the hand brake 33 to its "On" or full line position.

It is to be noted that the moment the hand brake is released, the brake switch is closed, and that when you energize the magnet you lock the ignition. In other words, when the hand brake is "Off" the circuit is closed. This circuit runs from the battery to the ignition switch, from the ignition switch to the magnet, and from the magnet to the brake switch, and thence to the ground 30.

When the hand brake is "On" the circuit is open and the ignition key can be removed. It will be obvious that you cannot shut the motor off until the hand brake is set, and accordingly I have provided a psychological reminder that will be a boon to the trade and will eliminate the danger of numerous accidents above recited.

Figure 3:
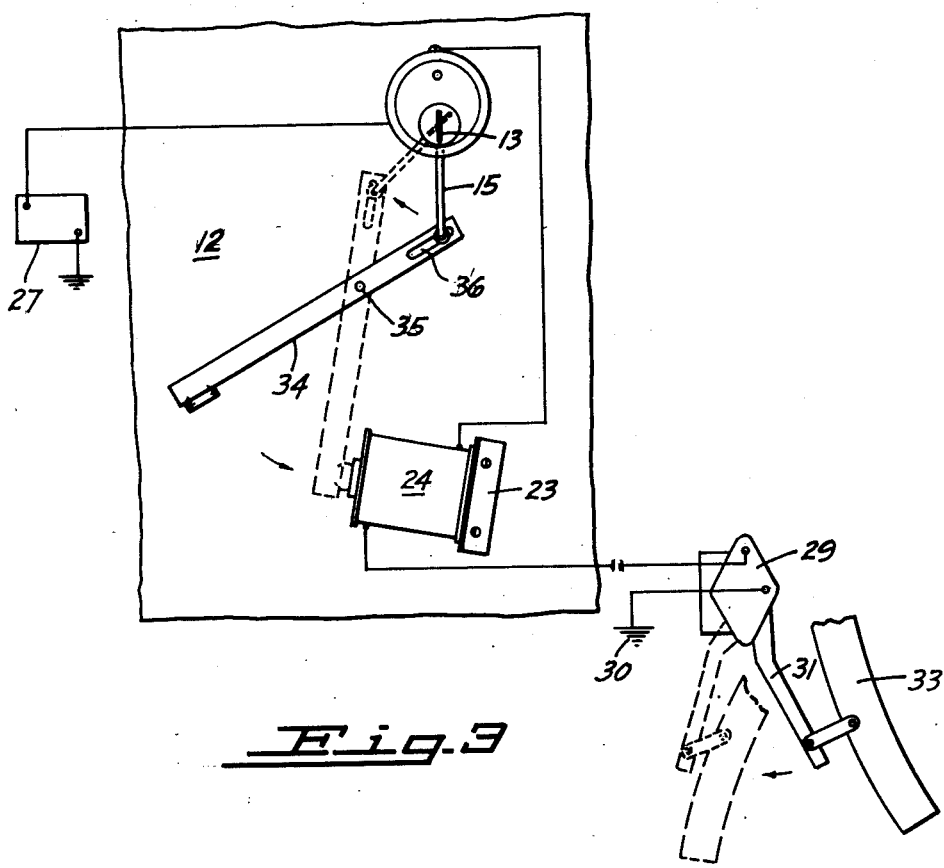
Fig. 3 is a variation of the arrangement shown in Fig. 1.

In the modified form of the invention as disclosed in Fig. 3, I have embodied the same principle of a positive means to prevent shutting off the engine of a motor vehicle until the hand brake is set.

In this figure of the drawing the numerals are the same as employed in Fig. 1, except with reference to a mechanical locking connection that is embodied in an elongated arm 34, that is pivotally mounted to the dash 12, as at 35. This bar is slotted at its upper end as at 36, for the reception therein of the hook-shaped end of the lever 15. The arrows in this figure indicate the direction of the movement of the arm from its full line to its dotted line position, as the ignition key is turned "Off" and "On" and contact is made by said arm with the magnet.

It is to be understood that the forms of my invention herewith shown and described are to be taken as preferred examples of the same and that various changes relative to the material, size, shape and arrangement of parts may be resorted to without departing from the spirit of the invention or the scope of the subjoined claim.

Having thus described my invention, I claim:

In combination with a motor vehicle having an ignition switch and a brake mechanism with an operating member for setting and releasing the brake mechanism, a lock member for the ignition switch operable to lock the switch against opening movement, an electro-magnet operative on the lock member for urging the said member into locking position when the electro-magnet is energized, an electric circuit for the electro-magnet having a switch therein, and means controlled by the operating member for closing the switch and for urging the lock member into locking position while the operating member occupies a brake releasing position.

JOSEPH F. FEYES.

References Cited in the file of this patent

UNITED STATES PATENTS

| Number | Name | Date |
|---|---|---|
| 2,031,344 | Thomasma | Feb. 18, 1906 |
| 2,509,400 | Roswell | May 30, 1950 |